May 7, 1963   J. E. LAGOUARDE   3,088,261
CORN-HARVESTER
Filed Dec. 14, 1959   9 Sheets-Sheet 1

INVENTOR
JEAN EMILE LAGOUARDE
By Irwin S. Thompson
ATTY.

May 7, 1963

J. E. LAGOUARDE 3,088,261

CORN-HARVESTER

Filed Dec. 14, 1959

INVENTOR
JEAN EMILE LAGOUARDE
By Irwin S. Thompson
ATTY.

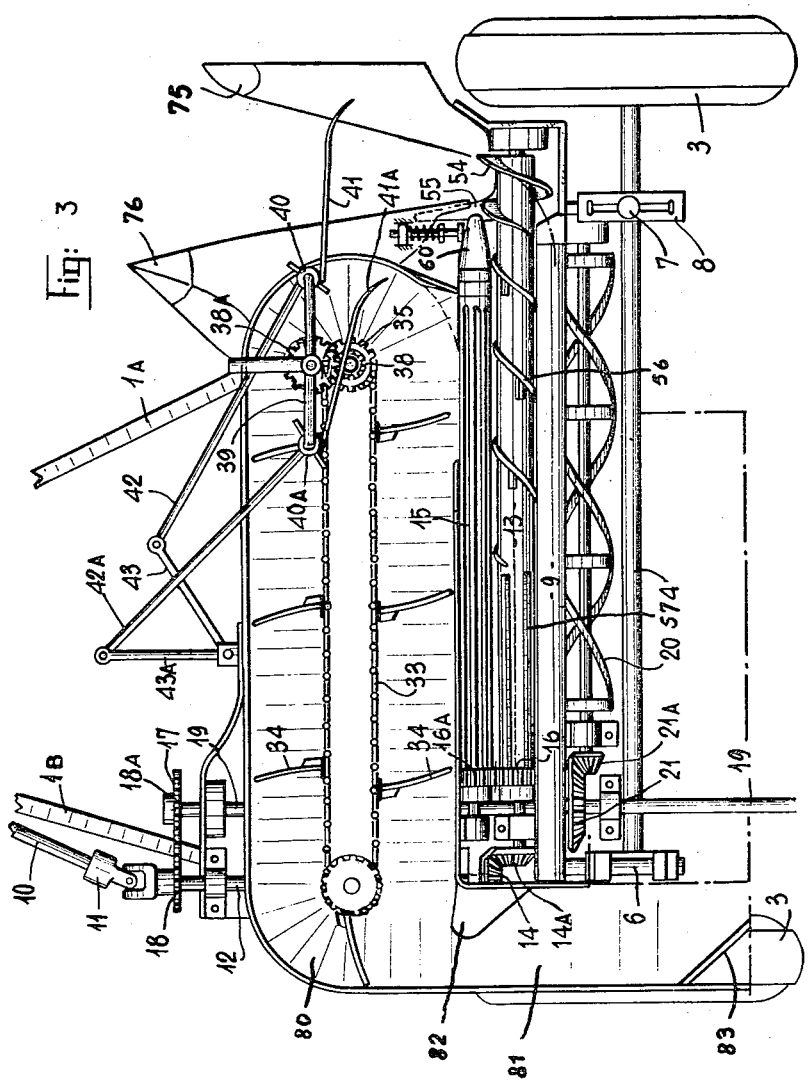

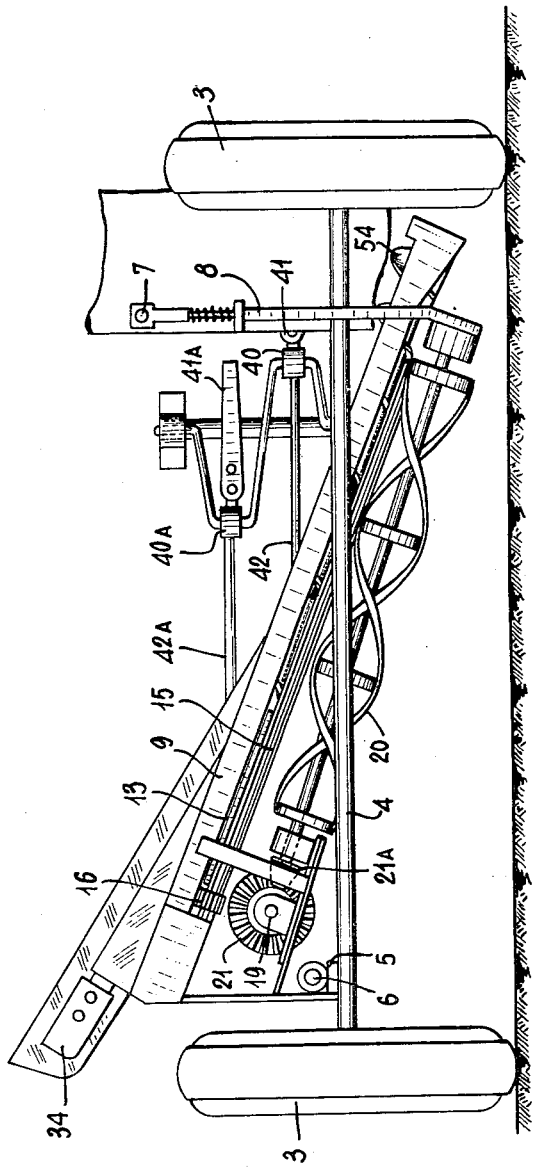

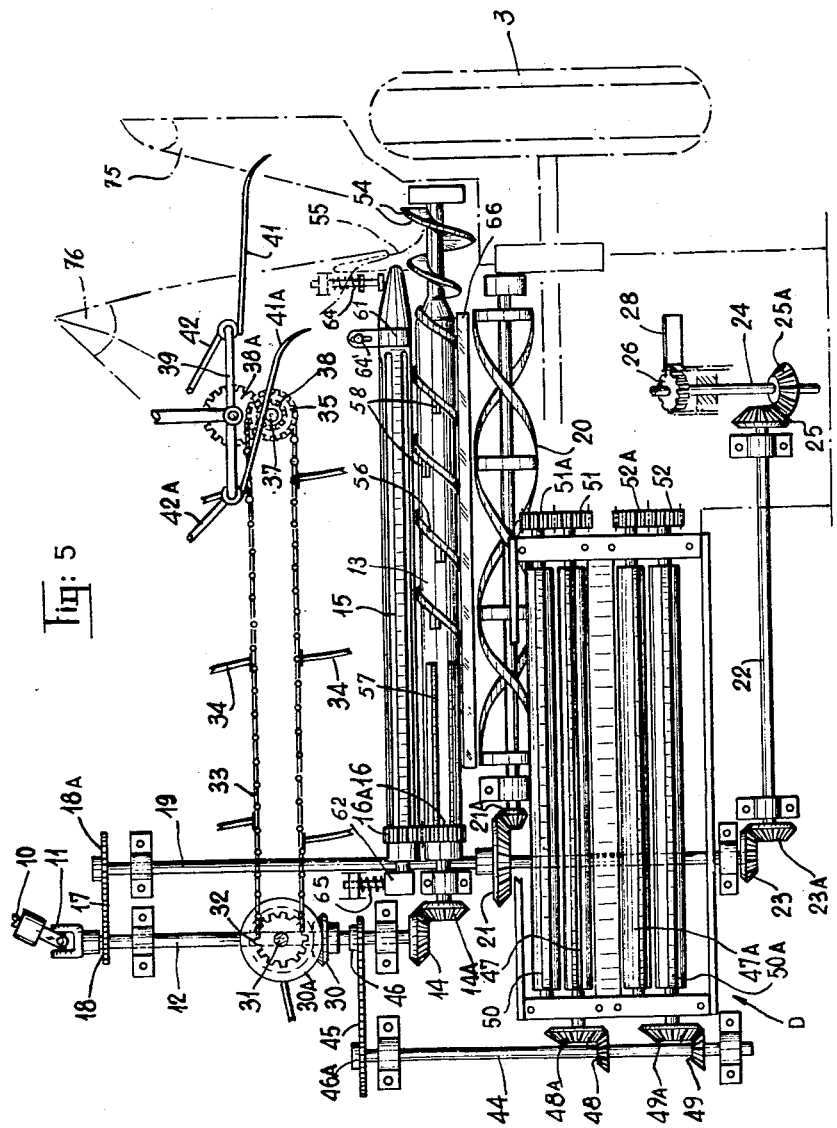

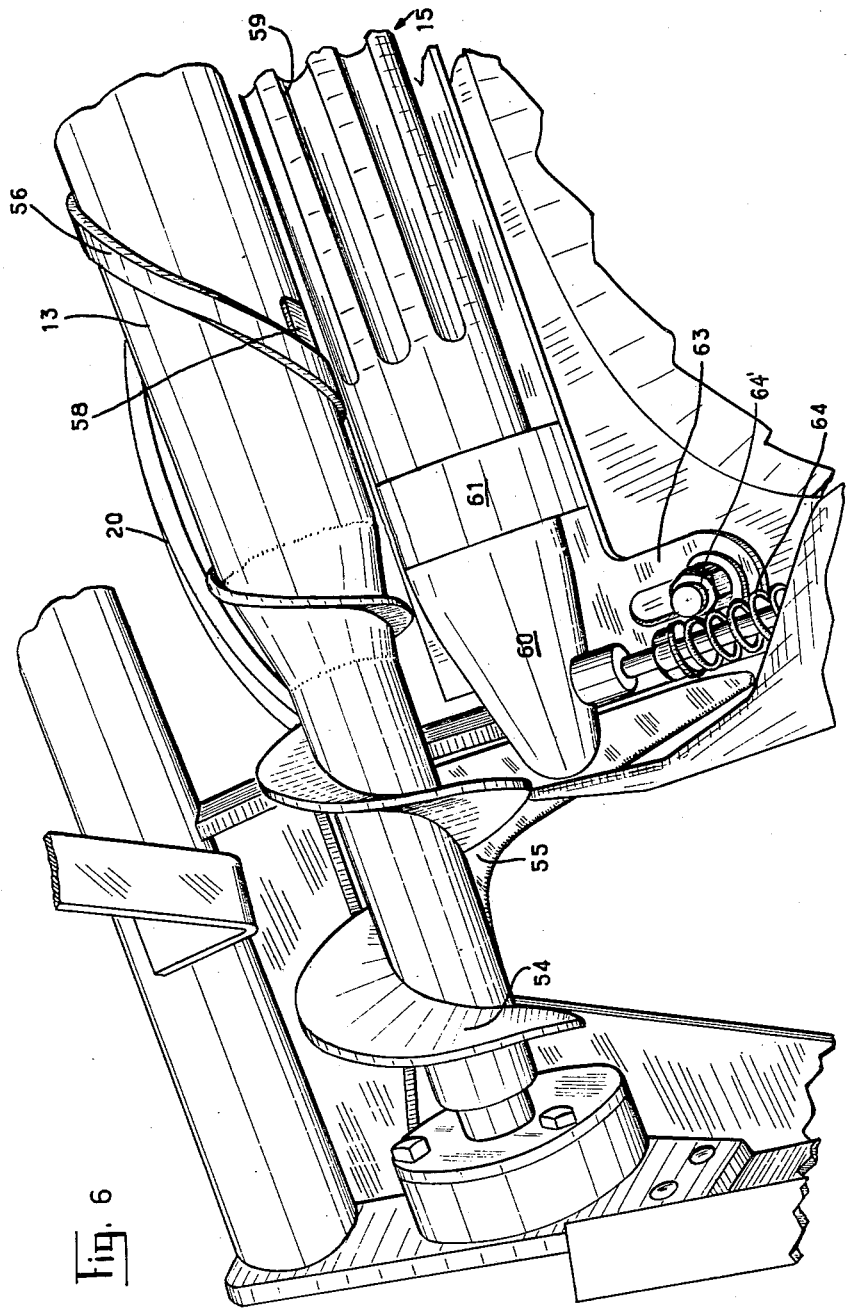

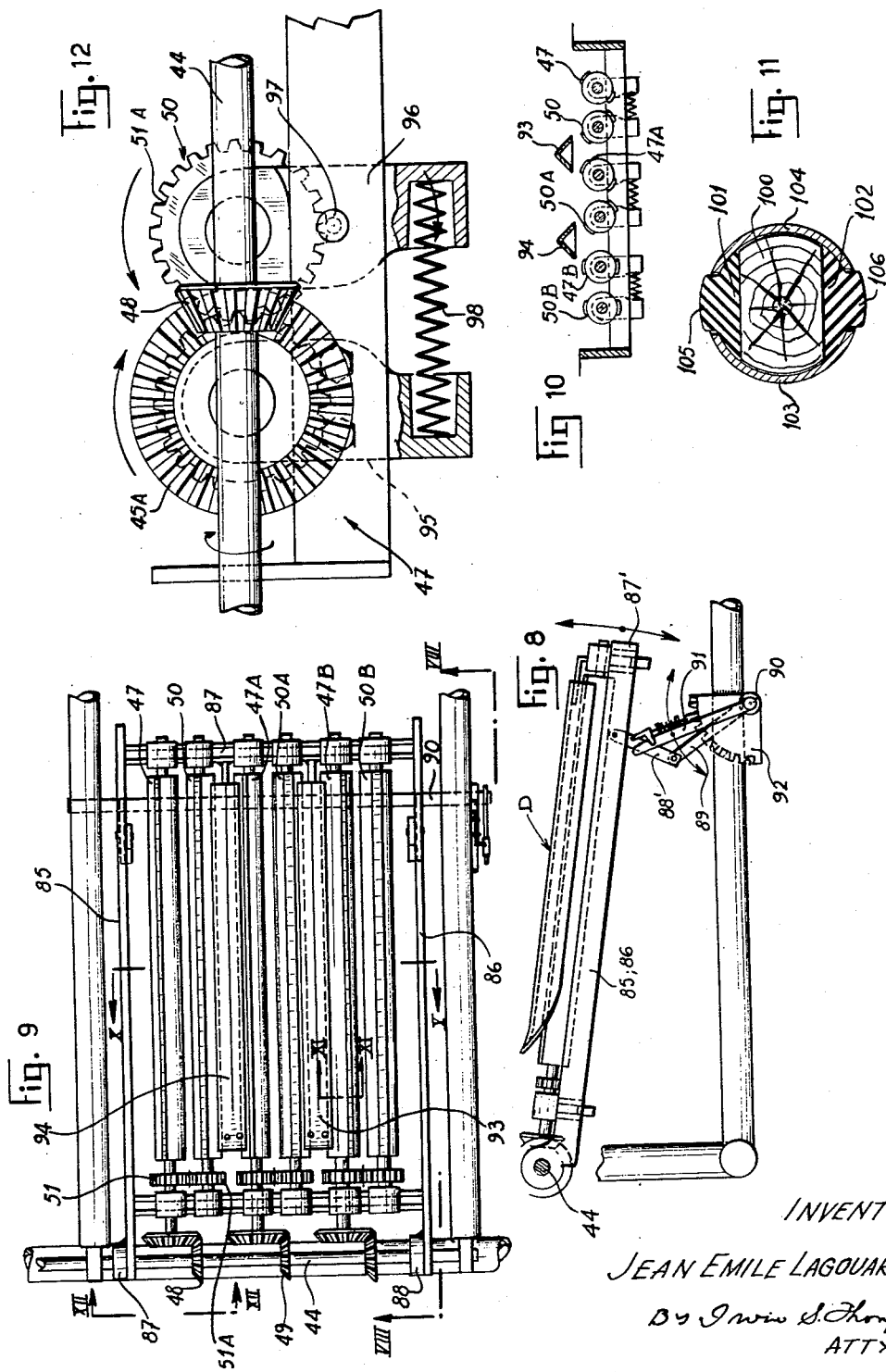

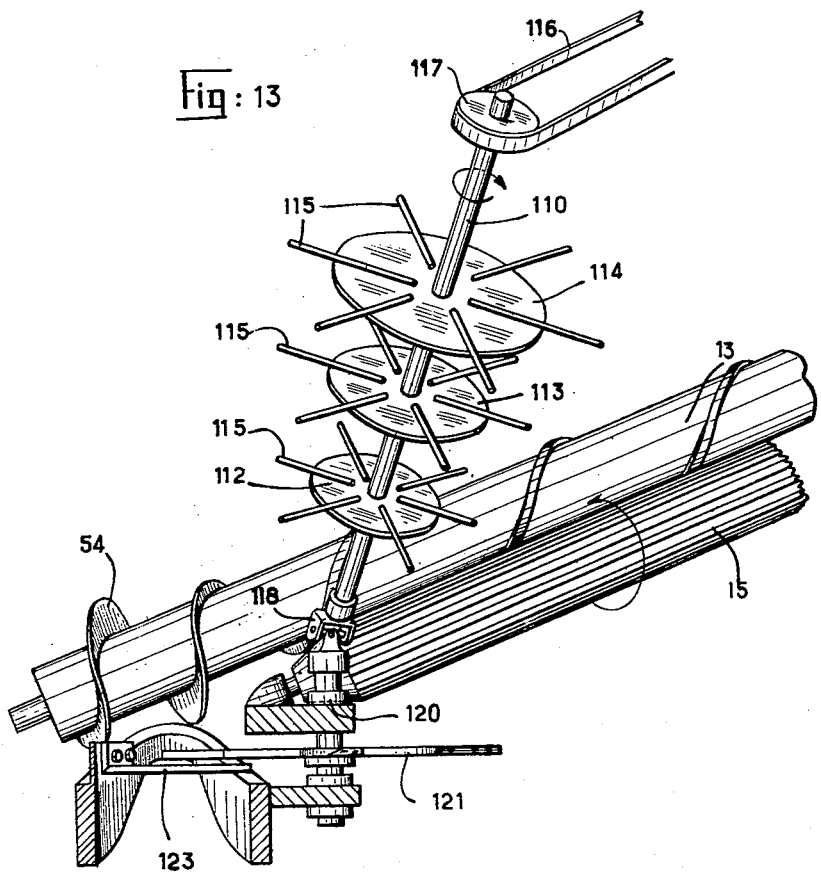

May 7, 1963  J. E. LAGOUARDE  3,088,261
CORN-HARVESTER
Filed Dec. 14, 1959  9 Sheets-Sheet 9

INVENTOR
JEAN EMILE LAGOUARDE
By Irwin S. Thompson
ATTY.

United States Patent Office 3,088,261
Patented May 7, 1963

3,088,261
CORN-HARVESTER
Jean Emile Lagouarde, Nay, France, assignor to Societe Anonyme Usines Dehousse, Basses Pyrenees, France, a corporation of France
Filed Dec. 14, 1959, Ser. No. 859,254
Claims priority, application France Dec. 15, 1958
14 Claims. (Cl. 56—18)

My invention has for its object a corn harvester of the type adapted to be drawn by a tractor and including means for cutting the corn stalks near the ground, removing the ears, chopping the stalks thus freed of their ears, removing the husks from the ears and loading the ears released of their husks into a suitable container.

Various machines of this type are known, which are generally equipped with a pair of snapping rollers revolving in opposite directions and adapted to remove the ears from the stalks which are engaged by a pair of raising noses and by shearing means, the stalks being then fed into a chopper and the ears being fed onto a husking table. Such machines are however heavy, bulky and expensive.

My invention has for its object the execution of such a machine in a substantially more compact, lighter and more economical form than the machines proposed hitherto.

My improved machine may be coupled with a tractor and includes in combination the conventional stalk-raising noses, means for cutting said stalks and a pair of snapping rollers. Now, according to my invention, the snapping rollers extend in a plane which is substantially perpendicular to the direction of progression of the machine between the rows of stalks to be harvested.

Said arrangement allows a substantial reduction in the bulk of the machine, while providing a reliable operation with an excellent efficiency. The lateral bending of the stalks over the snapping rollers may be ensured, on the one hand, by a suitable shaping of the cutting means engaging the stalks and, on the other hand, by means of suitably incurved guiding surfaces. The machine according to the invention makes use of the natural reaction of the corn stalks which bend forwardly when they are met by the cutting means. Said reaction serves for engagement of the stalks between the snapping rollers which extend into the cutting area.

The characteristics and advantages of the invention will appear clearly from the reading of the following description of a preferred embodiment, given by way of example, reference being made to the accompanying drawings, wherein:

FIG. 3 is a partial plan view showing, in particular, the snapping section.

FIG. 4 is a diagrammatic elevational view of said snapping section seen from the rear.

FIG. 5 is a diagrammatic plan view showing more particularly the controlling means and the means transmitting the different movements.

FIG. 6 is a detail perspective view of the input into the snapping section.

FIG. 8 is a detail elevational view of the husking table with its slope-adjusting mechanism as seen in the direction of the arrows VIII—VIII of FIG. 9.

FIG. 9 is a plan view of said table.

FIG. 10 is a cross-section of the table through line X—X of FIG. 9.

FIG. 11 is a detail sectional view through line XI—XI of FIG. 9.

FIG. 12 is a detail end-view seen in the direction of the arrows XII—XII of FIG. 9.

FIG. 13 is a perspective view of a modified embodiment of the stalk-bending and cutting arrangement.

Figure 1:
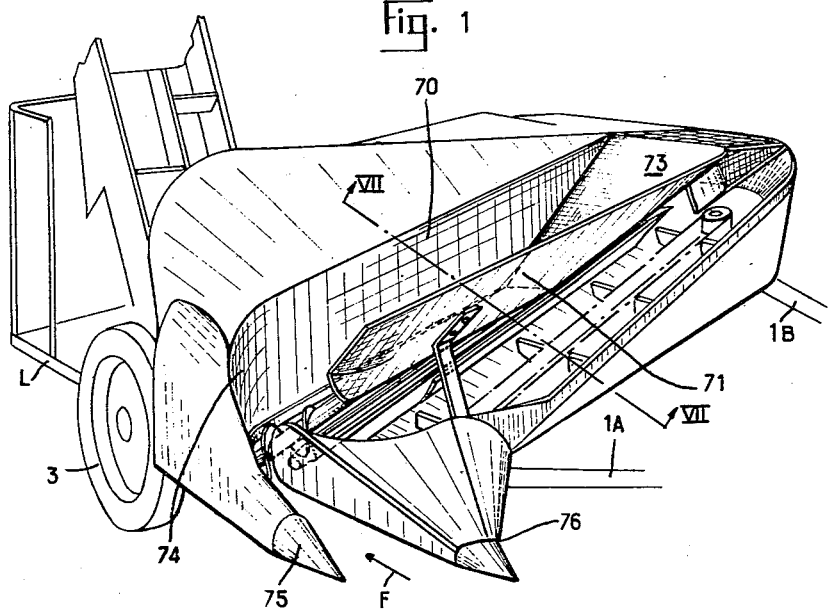
FIG. 1 is a diagrammatic perspective view of a machine according to the invention.

In the embodiment illustrated, and shown more particularly in FIGS. 1 to 4, a frame including two girders 1A and 1B is connected, on the one hand, with a tractor 2 and it bears, on the other hand, on an axle 4 carrying two wheels 3. Said axle carries furthermore, on one side, a bearing plate 5 through which passes an axis 6 forming an extension of the girder 1B of the frame and on the opposite side of the frame a vertical screw 7 cooperates with the threaded upper end of the upright 8 rigid with the frame and extending in a plane passing through the other girder 1A (FIGS. 3 and 4). The girders 1A and 1B form with the sloping cross-member 9 the supporting members of the frame, the general slope of which may be modified through operation of the worm 7 providing a rocking of the frame round the axis 6. Further cross-members, stays and supports which need not be described in detail are incorporated with the frame, so as to ensure its rigidity and the securing of various bearings and carrier boxes for the mechanism to be described hereinafter.

The mechanism of the machine is actuated, as shown more particularly in FIG. 5, starting from a drive shaft 10 adapted to be connected with a supply of energy on the tractor, which supply is not illustrated. Said shaft 10 controls, through the agency of a Cardan joint 11, a shaft 12 which transmits its movement to a snapping roller 13, through the agency of a couple of bevel pinions 14, 14A. The snapping roller 13 actuates the cooperating snapping roller 15 through a pair of sprocket wheels 16, 16A.

The movement of the shaft 12 is also transmitted through a chain 17 carried by the pinions 18, 18A to a shaft 19 actuating a stalk-chopping roller 20 through the agency of a pair of bevel gears 21, 21A. The shaft 19 also controls the movement of an intermediate shaft 22 through the agency of a further pair of bevel gears 23, 23A. The movement of the intermediate shaft 22 is transmitted through two bevel gears 25, 25A to a shaft 24 carrying a pinion 26 actuating the chain 27 of a so-called output elevator provided with buckets or blades 28, as shown, more particularly, in FIG. 2, said elevator chain 27 passing over a chain-tensioning and guiding pinion 29.

To the shaft 12 is also keyed a bevel pinion 30 acting, through the agency of an associated bevel pinion 30A, on a shaft 31 carrying a sprocket pinion 32 driving the chain 33 of an ear conveyor or elevator provided with buckets 34. The chain 33 of said elevator passes over a chain-tensioning and guiding pinion 35 transmitting its movement, through the agency of a Cardan joint 36 (see FIG. 2), to a shaft 37 to which is keyed a sprocket pinion 38 transmitting in its turn its movement, through the agency of a pinion 38A, to a crankshaft 39, said crankshaft carrying and actuating stalk-bending members 40, 40A carrying in their turn flexible blades 41, 41A and connected furthermore with guiding rods 42, 42A pivotally secured to rocking supports 43, 43A.

Lastly, the shaft 12 actuates, through the agency of a chain 45 passing over pinions 46, 46A, a shaft 44 controlling the husking table D. Said control is performed through the agency of two couples of bevel gears 48, 48A and 49, 49A driving respectively the rollers 47 and 47A of the table. Said rollers actuate in their turn associated rollers 50, 50A through the agency of couples of sprocket pinions 51, 51A and 52, 52A, the number of pairs of rollers thus equipping the husking table varying, of course, according to the requirements of the machine considered. Certain details of the husking table will be disclosed hereinafter, reference being made to FIGS. 8 to 12. The snapping roller 13 is provided at its lower or input end with a helically shaped blade 54, the outline of which defines a frusto-conical surface, as shown, more particularly, in FIG. 6. The edge of said blade engages a member 55 matching a fraction of its outline and provided with a cutting edge forming the knife. The helical blade 54 merges into a flat strip 56 wound helically over a little more than one half of the snapping roller, the helical rib thus formed having a larger pitch than the input pitch of the blade 54. The remote end of the snapping roller is fitted with longitudinal ribs 57; longitudinal rib elements are futhermore provided at intervals, as shown at 57, starting from different points of the helical rib 56. The other associated snapping roller 15 is grooved or fluted and its flutings are provided each with a sharp leading edge 59. This associated roller 15 extends into registry with a fraction of the longitudinal blade 54 provided with a frusto-conical surface, said extension forming an ogee-shaped section 60, the outline of which matches that of said blade 54. The bearings 61 and 62 for said associated roller are fitted on slideways 63 and are urged towards the first snapping roller 13 by spring-controlled pusher members 64 and 65, while stops, such as 64', limit advantageously the movement of the roller 15 towards the roller 13, so as to prevent any direct friction between said rollers.

Figure 7:
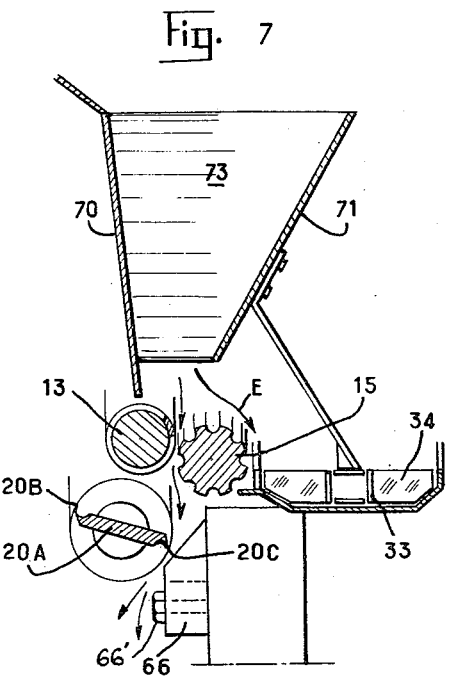
FIG. 7 is a detail elevational cross-sectional view of the snapping section in a transverse vertical plane shown at VII—VII in FIG. 1.
Figure 2:
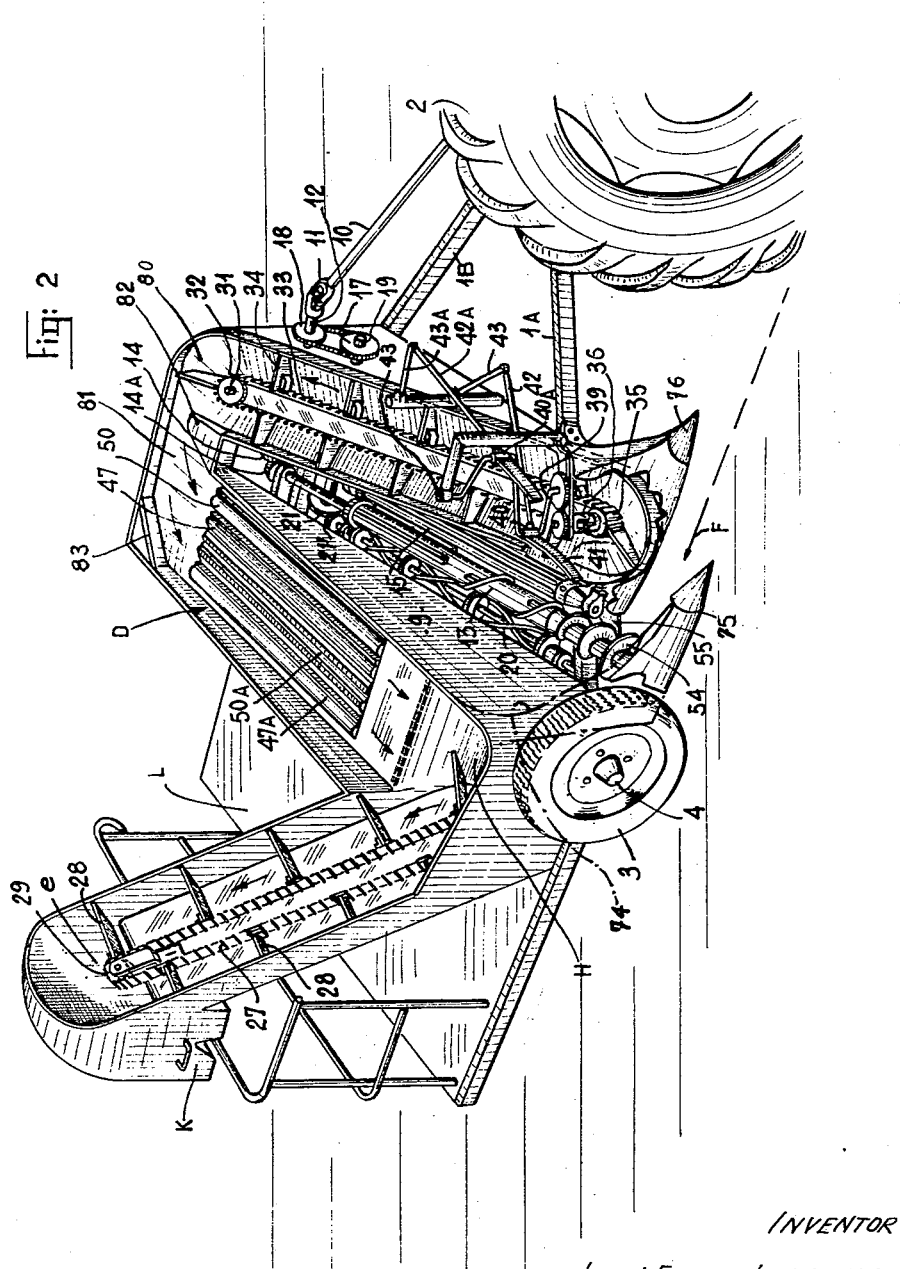
FIG. 2 is a similar view of the machine, parts of which have been removed.

FIG. 7 is a cross-section showing the location of the rollers 13 and 15, chiefly with reference to the chopping roller 20 which may be constituted by two cutting blades wound helically, as shown in FIGS. 2 to 4, or else, as shown at 20A in FIG. 7, by a blade twisted into a gimlet shape provided with two cutting ridges 20B and 20C. The chopping roller cooperates in all cases with an auxiliary blade 66 located at an adjustable height by means of adjusting nuts 66' on an adjacent section of the frame.

The framing sheets of the machine form, in registry with the roller 13 and 15, a sort of hopper adapted to receive and guide the stalks. Said hopper includes, as shown in FIGS. 1 and 7, a rear, almost vertical wall 70 located in registery with the snapping roller 13, a front wall sloping at about 60° with reference to horizontality towards the snapping roller 15 and stopping at a short distance above the latter, so as to provide a gap for the passage of the ears in the direction of the arrow E, towards the conveyor 33, 34. Furthermore, a back 73 is provided, which slopes at about 30° with reference to a horizontal plane and extends over the driving mechanism on the inner side thereof and, lastly, a stalk-bending sloping surface 74 (FIG. 1) which merges into an outer raising nose 75 defining an input channel designated by the arrow F with the inner raising nose 76.

As apparent, in particular from inspection of FIGS. 2 and 3, the upper area 80 in which the buckets 34 of the conveyor or elevator 33 are turned upside down, is connected with a longitudinal channel 81 through which the ears are transferred onto the husking table D. The input into said channel is closed by a projecting member or hindrance 82 registering with the input of the return path of the conveyor 33. The part played by said hindrance will appear clearly hereinafter in the disclosure of the operation of the machine. At the end of the transfer channel 81 is arranged, on the other hand, a deflecting sheet 83, the angular setting of which may be adjusted by any conventional means such as a slot and bolt connection 83'.

At the lower end of the husking table D is arranged a trough H (FIG. 2) out of which the buckets 28 of the output elevator 27 remove the ears. Said elevator opens into a spout A in vertical registry with a platform L fitted at the rear of the machine, said spout being advantageously provided with means for securing bags thereon.

The husking table D over which the transfer channel 81 opens is carried by a frame of an adjustable slope including two girders 85 and 86 and a lower cross-member 87', as illustrated in FIGS. 8 to 12. The girders 85 and 86 carry lateral bushings 87 and 88 for pivotal connection with the shaft 44 driving the table rollers. In proximity with the lower cross-member 87', a supporting link 88' is pivotally secured to each girder, the links 88' being pivotally secured to arms 89 carried by a common spindle 90, the angular setting of which is adjustable, as required, by means of a lever 91 adapted to be locked in various positions defined by notches provided to this end on an adjustable sector 92 and which may be reached from the rear platform L.

It will be remarked that in the embodiment illustrated in FIGS. 9 and 10, the husking table includes, in addition to the rollers 47, 50 and 47A, 50A already shown in the preceding figures, a third pair of rollers 47B, 50B, while separating angle bars 93, 94 are arranged in registry with the intervals separating the successive pairs of rollers from one another. In each of said pairs of rollers, such as the pair 47, 50, for instance (see FIG. 12), the roller 47 which is positively driven is mounted in stationary bearings 95, while the associated roller 50 is carried by bearings 96 (FIG. 12) which are angularly adjustable round a pivotal axis 97; a compression spring 98, fitted between two lower extensions of said bearings, urges the coupling pinions 51, 51A on the two rollers into engagement, and the rollers of the pair into their normal operative spaced position. Through this arrangement, the roller 50 may move elastically away from the driving roller 47, if required, while compressing the spring 98.

FIG. 11 shows the structure of each husking roller. Said roller includes a wooden or the like mandrel 100 provided with two flat parallel surfaces and carrying two rubber strips 101, 102 of a substantially trapezoidal cross-section, the edges of which are clamped underneath two metal shells 103, 104 riveted to either side of the said mandrel. The medial projecting section 105, 106 of the strips lead to the formation of an uneven surface on the roller and, consequently, they serve as grasping means through which it is possible to tear the husks off the ears.

The operation of the machine is as follows:

The machine being drawn by the tractor 2 in a manner such that the stalks of a row of corn plants enter in succession the input channel F defined between the stalk-raising noses 75 and 76, said stalks engage the helical input blade 54 on the snapping roller 13. Said helical blade 54, cooperating with the knife 55, cuts the stalks and carries the latter along in cooperation with the ogee-shaped section of the associated roller 15 and through the gap between the two rollers. The bent surface 74 provides for the bending of the stalks over the rollers 13 and 15 and said bending of the stalks over the rollers may be furthered if desired by the bending blades 41, 41A. The helical blade 56 on the snapping roller 13, cooperating with the flutings in the associated snapping roller 15, provides for the gradual elimination of the stalks and the removal of the ears which drop onto the conveyor 33. The action after the manner of a suction by these snapping rollers which draw said stalks outwardly is furthered by the longitudinal rib elements, while the very long stalks are drawn in by the longitudinal ribs 57 arranged at the end of the snapping roller 13. As they pass out of the rollers 13, 15, the stalks enter the chopper 20, which cuts them into small fragments to be abandoned on the field.

The ears, when separated from the stalks, follow first the downwardly moving strand of the conveyor 33, 34 and then the upwardly moving strand of the latter in the area 80 in which the buckets or blades 34 are turned upside down, the ears are projected centrifugally, as a consequence of the rotation of the buckets, into the transfer channel 81. However, those ears, the via viva of which is not sufficient to project them beyond the hindrance 82, fall back into the downwardly directed strand of the conveyor 33, 34. Said arrangement cuts out any risk of the conveyor being jammed. The ears, which have passed beyond the hindrance 82, reach the husking table D and some of them, which may have impinged previously against the deflecting sheet 83, are urged back by the latter onto the table.

The ears sink through gravity over the husking table along a direction parallel with the axes of the rollers 47, 50 and the husks are taken hold of and removed by the elastic ribs 105, 106 on the associated husking rolls revolving pairwise in opposite directions. The husks torn off are left on the field. The slope of the husking table is adjusted in accordance with the nature of the corn harvested, so as to increase or to reduce the average duration of passage of the ears over the said table.

The cleaned ears drop into the dished container or trough H out of which they are removed by the elevator 27, 28 which feeds them through the spout K, either into a bag capping the latter, or else, into any other type of container provided for this purpose on the rear platform L.

The cutting height may be adjusted through the agency of the screw 7 (FIG. 4) which allows modifying the height above ground of the helical blade 54 and of the knife 55 associated therewith through a rocking of the entire frame round of the axis 6.

It appears therefore from the reading of the preceding description, that the corn harvest, introduced into the machine through the input F, is immediately bent laterally inside the hopper extending above the snapping rollers 13 and 15 and, after removal and chopping of the stalks during their upwardly directed movement, along said rollers sloping above a horizontal plane in a direction transverse with reference to the direction of progression of the machine, the ears are raised and fed into the conveyor 33 which extends also transversely and said ears are projected centrifugally into the longitudinal transfer channel 81, until they reach the husking table over which they sink laterally in the opposite direction down to the output conveyor 27 which is arranged substantially in alignment with the input of the machine. Said arrangement of the parts allows a considerable reduction of the bulk and weight and, consequently, of the cost price of the machine.

Figure 14:
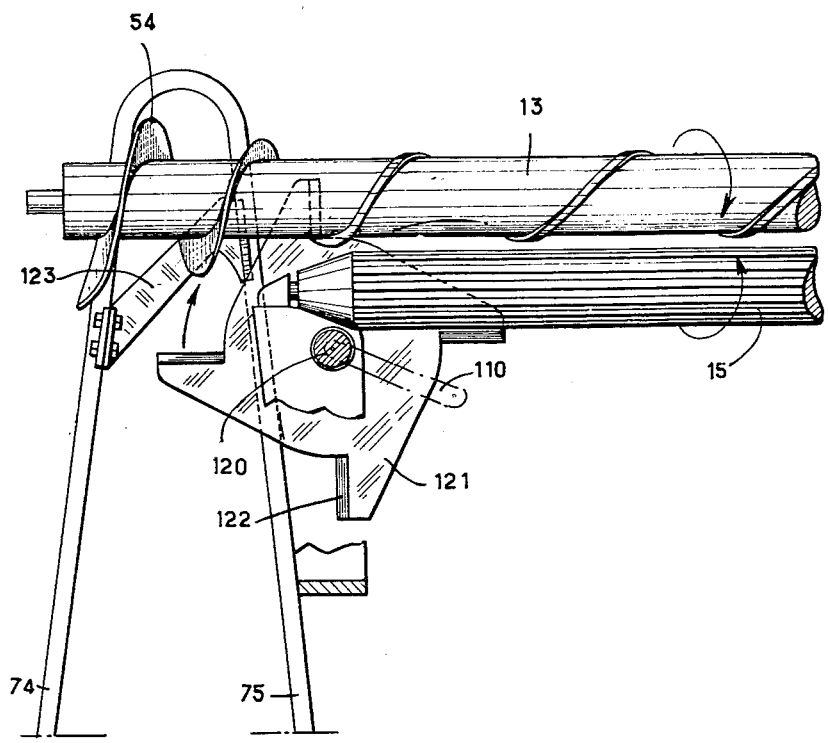
FIG. 14 is a plan view of said modification.

The machine described may form the object of various modifications without unduly widening the scope of the invention. Thus, for instance, FIGS. 13 and 14 show an optional modification of the stalk-bending means and of the cutting means. In said modification, the bending means include chiefly a sloping shaft 110, to which are keyed discs 112, 113, 114, the diameter of which increases from bottom to top, while yielding projecting metal rods 115 are arranged radially round the discs. The shaft may be driven by a belt 116 passing over a pulley 117 or any other suitable means transmitting the movement derived from any rotary part of the machine. The said shaft 110 is carried in supports which are not illustrated and its lower end terminates with a Cardan joint 118 driving a vertical shaft 120 carrying a multi-blade cutter 121. The blades or knives 122 on the cutter, the number of which is equal to four, for instance, revolve and sweep over a blade 123 secured across the lower ends of the noses 74 and 75 between which the corn stalks are engaged. To the rear of the stationary blade 123 is positioned the helical blade 54 similar to that described hereinabove and carried, as precedingly, by the snapping roller 13, the operation remaining the same as that described precedingly.

The speed of progression does not need to be in direct relationship with the speed of the rollers, since the stalks are immediately cut off and no tearing out of the roots is to be feared, whereby an increased efficiency is obtained.

It is also possible to consider various modifications as to the manner of removing the ears fed by the output conveyor 27, 28.

It should be remarked that the angular adjustment of the frame round its axis 6 may be performed in any other conventional suitable manner. It should be remarked that the lateral translational movement of the stalks through the snapping rollers and their elimination are furthered by the helical arrangement of the chopper blades, said chopper blades revolving at a somewhat higher speed than the snapping rollers.

What I claim is:

1. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantial transverse alignment with said input noses, means urging the stalks passing between the two input noses and cut by the cutter into substantial registry with the corresponding end of the pair of snapping rollers, an endless conveyor substantially perpendicular to the direction of progression of the machine and located to the front of the pair of snapping rollers and including a downwardly moving strand facing said rollers and fed by the ears passing out of the snapping rollers and an upwardly moving strand facing away from said rollers and over which the ears are drawn, husking rollers extending in substantial parallelism with said pair of snapping rollers and receiving said ears from said conveyor, means dropping the ears out of the upwardly moving conveyor strand into the cooperating end of the husking rollers, means driving the snapping rollers, husking rollers and conveyor, and means collecting the ears out of the husking means at the rear of the machine.

2. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantial transverse alignment with said input noses, means urging the stalks passing between the two input noses and cut by the cutter into substantial registry with the corresponding end of the pair of snapping rollers, a stalk-chopping roller located on the frame underneath the snapping rollers in substantial parallelism with the latter, transversely of the frame, a stationary knife rigid with the frame and cooperating with said chopping roller, an endless conveyor substantially perpendicular to the direction of progression of the machine and located to the front of the pair of snapping rollers and including a downwardly moving strand facing said rollers and fed by the ears passing out of the snapping rollers and an upwardly moving strand moving away from said rollers and onto which the ears are drawn, husking rollers extending in substantial parallelism with said pair of snapping rollers and receiving said ears from said conveyor, means dropping the ears out of the upwardly moving conveyor strand into the cooperating end of the husking rollers, means driving the snapping rollers, husking rollers and conveyor, and means collecting the ears out of the husking means at the rear of the machine.

3. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a pair of snapping rollers extending along parallel lines substantially perpendicular to the direction of progression of the machine in substantial transverse alignment with said input noses, an axial extension of one of the snapping rollers terminating in front of said noses, a blade carried by said extension, the outline of which defines a frusto-conical surface, a cutter rigid with the frame, substantially tangent to a section of said frusto-conical surface and adapted to cut the stalks of a row, means urging the stalks passing between the two input noses and cut by the cutter into substantial registry with the corresponding end of the pair of snapping rollers, an endless conveyor substantially perpendicular to the direction of progression of the machine and located to the front of the pair of snapping rollers and including a downwardly moving strand facing said rollers and fed by the ears passing out of the snapping rollers and an upwardly moving strand moving away from said rollers and onto which the ears are drawn, husking rollers extending in substantial parallelism with said pair of snapping rollers and receiving said ears from said conveyor, means dropping the ears out of the upwardly moving conveyor strand into the cooperating end of the husking rollers, means driving the snapping rollers, husking rollers and conveyor, and means collecting the ears out of the husking means at the rear of the machine.

4. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a pair of snapping rollers extending along parallel lines substantially perpendicular to the direction of progression of the machine in substantial transverse alignment with said input noses, a helical blade, carried by one roller and the outline of which defines a frusto-conical surface, a cutter rigid with the frame, substantially tangent to a section of said frusto-conical surface and adapted to cut the stalks of a row, through cooperation with the broader section of said blade, an ogee-shaped extension coaxially rigid with the outer snapping roller and cooperating with the helical blade on the side of said cutter facing away from the noses to urge laterally the cut stalks passing between the noses into engagement with the corresponding ends of the snapping rollers, an endless conveyor substantially perpendicular to the direction of progression of the machine and located to the front of the pair of snapping rollers, and including a downwardly moving strand facing said rollers, and fed by the ears passing out of the snapping rollers and an upwardly moving strand facing away from said rollers and over which the ears are drawn, husking rollers extending in substantial parallelism with said pair of snapping rollers and receiving said ears from said conveyor, means dropping the ears out of the upwardly moving conveyor strand into the cooperating end of the husking rollers, means driving the snapping rollers, husking rollers and conveyor, and means collecting the ears out of the husking means at the rear of the machine.

5. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a pair of snapping rollers extending along parallel lines substantially perpendicular to the direction of progression of the machine in substantial transverse alignment with said input noses, a helical blade, carried by one roller and the outline of which defines a frusto-conical surface, a cutter rigid with the frame, substantially tangent to a section of said frusto-conical surface and adapted to cut the stalks of a row through cooperation with the broader section of said blade, an ogee-shaped extension coaxially rigid with the outer snapping roller and cooperating with the helical blade on the side of said cutter facing away from the noses to urge laterally the cut stalks between the noses into engagement with the corresponding ends of the snapping rollers, a helical rib of a larger pitch than said helical blade and forming an extension thereof on the first-mentioned roller on the side facing away from the noses, further longitudinal rib sections on the first-mentioned roller starting from various points of the helical rib in a direction facing away from the input noses, an endless conveyor substantially perpendicular to the direction of progression of the machine and located to the front of the pair of snapping rollers, and including a downwardly moving strand facing said rollers, and fed by the ears passing out of the snapping rollers and an upwardly moving strand facing away from said rollers and over which the ears are drawn, husking rollers extending in substantial parallelism with said pair of snapping rollers and receiving said ears from said conveyor, means dropping the ears out of the upwardly moving conveyor strand into the cooperating end of the husking rollers, means driving the snapping rollers, husking rollers and conveyor, and means collecting the ears out of the husking means at the rear of the machine.

6. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantital transverse alignment with said input noses, a shaped casing of metal sheet facing the input stalk-raising noses and including a metal sheet merging into the nose nearest the outside of the frame and guiding the stalks passing between the noses into engagement with the snapping rollers, an endless conveyor substantially perpendicular to the direction of progression of the machine and located to the front of the pair of snapping rollers, and including a downwardly moving strand facing said rollers and fed by the ears passing out of the snapping rollers, and an upwardly moving strand facing away from said rollers and over which the ears are drawn, husking rollers extending in substantial parallelism with said pair of snapping rollers and receiving said ears from said conveyor, means dropping the ears out of the upwardly moving conveyor strand into the cooperating ends of the husking rollers, means driving the snapping rollers, husking rollers and conveyor, and means collecting the ears out of the husking means at the rear of the machine.

7. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of front and rear snapping rollers extending along parallel lines substantially perpendicular to the direction of progression of the machine in substantial transverse alignment with said input noses, a shaped casing of metal sheet facing the input stalk-raising noses and including a metal sheet merging into the nose nearest the outside of the frame and guiding the stalks passing between the noses into engagement with the snapping rollers, a rear substantially vertical wall in substantial registry with the axis of the rear snapping roller and merging laterally into said incurved stalk guiding sheet, a front wall sloping towards the front snapping roller and stopping clear above the latter to provide a forwardly directed passageway for the ears snapped off between the snapping rollers, and a transverse wall interconnecting the inner ends of said two walls and sloping by about 30° with reference to horizontality, an endless conveyor substantially perpendicular to the direction of progression of the machine and located to the front of the pair of snapping rollers, and including a downwardly moving strand facing said rollers, and fed by the ears passing out of the snapping rollers, and an upwardly moving strand facing away from said rollers and over which the ears are drawn, husking rollers extending in substantial parallelism with said pair of snapping rollers and receiving said ears from said conveyor, means dropping the ears out of the upwardly moving conveyor strand into the cooperating end of the husking rollers, means driving the snapping rollers, husking rollers and conveyor, and means collecting the ears out of the husking means at the rear of the machine.

8. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantial transverse alignment with said input noses, a rotary member including yielding radial members adapted to urge the stalks passing out of the gap between the two input noses and cut by the stalk cutter into substantial registry with the corresponding end of the roller pair, an endless conveyor substantially perpendicular to the direction of progression of the machine and located to the front of the pair of snapping rollers, and including a downwardly moving strand facing said rollers, and fed by the ears passing out of the snapping rollers, and an upwardly moving strand facing away from said rollers and onto which the ears are drawn, husking rollers extending in substantial parallelism with said pair of snapping rollers and receiving said ears from said conveyor, means dropping the ears out of the upwardly moving conveyor strand into the cooperating end of the husking rollers, means driving the snapping rollers, husking rollers and conveyor, and means collecting the ears out of the husking means at the rear of the machine.

9. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantial transverse alignment with said input noses, means urging the stalks passing between the two input noses and cut by the cutter into substantial registry with the corresponding ends of the pair of snapping rollers, an endless conveyor substantially perpendicular to the direction of progression of the machine and located to the front of the pair of snapping rollers and including a downwardly moving strand facing said rollers and fed by the ears passing out of the end of the snapping rollers facing away from the input noses and an upwardly moving strand facing away from said rollers and over which the ears are raised, a short ear transfer channel lying longitudinally of the frame along the side facing away from the input noses and across the snapping rollers, extending forwardly under the upper end of the upwardly moving strand of the endless conveyor and into which the ears are projected centrifugally by said conveyor as they enter the upper end of the upwardly moving strand, husking rollers extending in substantial parallelism with said pair of snapping rollers and receiving said ears from said conveyor, means dropping the ears out of the rear end of said channel into the cooperating ends of the husking rollers, means driving the snapping rollers, husking rollers and conveyor, and means collecting the ears out of the husking means at the rear of the machine.

10. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantial transverse alignment with said input noses, means urging the stalks passing between the two input noses and cut by the cutter into substantial registry with the corresponding end of the pair of snapping rollers, an endless conveyor substantially perpendicular to the direction of progression of the machine and located to the front of the pair of snapping rollers and including a downwardly moving strand facing said rollers and fed by the ears passing out of the snapping rollers and an upwardly moving strand facing away from said rollers and over which the ears are drawn upwardly, a short ear transfer channel extending longitudinally of the frame, along the side facing away from the input noses and across the snapping rollers, projecting forwardly under the upper end of the upwardly moving strand of the endless conveyor and into which the ears are projected centrifugally by said conveyor as they enter the upper strand of the conveyor over the upper connection between the two strands of the conveyor, a hindrance fitted at the input of said transfer channel on the wall thereof nearest the corresponding end of the conveyor and stopping the ears projected with a force insufficient to make them pass beyond said hindrance, husking rollers extending in substantial parallelism with said pair of snapping rollers and receiving said ears from said conveyor, means dropping the ears out of the rear end of said channel into the cooperating end of the husking rollers, means driving the snapping rollers, husking rollers, and conveyor, and means collecting the ears out of the husking means at the rear of the machine.

11. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantial transverse alignment with said input noses, the axes of said rollers sloping with reference to a horizontal plane and one of the rollers being located slightly above and to the rear of the other roller, means urging the stalks passing between the two input noses and cut by the cutter into substantial registry with the corresponding end of the pair of snapping rollers, an endless conveyor substantially perpendicular to the direction of progression of the machine and located to the front of the pair of snapping rollers and including a downwardly moving strand facing said rollers and fed by the ears passing out of the snapping rollers and an upwardly moving strand facing away from said rollers and over which the ears are drawn, husking rollers extending in substantial parallelism with said pair of snapping rollers and receiving said ears from said conveyor, a husking table including a framing support and at least two pairs of juxtaposed husking rollers extending in a generally transverse direction with reference to the longitudinal axis of progression of the machine and sloping downwardly from the side of the machine opposed to the input noses towards the latter, means dropping the ears out of the upwardly moving conveyor strand into the cooperating end of the husking rollers, means driving the snapping rollers, husking rollers and conveyor, and means collecting the ears out of the husking means at the rear of the machine.

12. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantial transverse alignment with said input noses, the axes of said rollers sloping with reference to a horizontal plane and one of the rollers being located slightly above and to the rear of the other roller, means urging the stalks passing between the two input noses and cut by the cutter into substantial registry with the corresponding end of the pair of snapping rollers, and endless conveyor substantially perpendicular to the direction of progression of the machine and located to the front of the pair of snapping rollers and including a downwardly moving strand facing said rollers and fed by the ears passing out of the snapping rollers and an upwardly moving strand moving away from said rollers and onto which the ears are drawn, a husking table including a framing support and at least two pairs of juxtaposed husking rollers extending in a generally transverse direction with reference to the longitudinal axis of progression of the machine and sloping downwardly from the side of the machine opposed to the input noses towards the latter, a common driving shaft for the different husking rollers, to which said framing support is pivotally secured, a pivotal link system carrying the inner end of said framing support near said driving shaft to adjust the slope of the framing support, means dropping the ears out of the upwardly moving conveyor strand into the cooperating end of the husking rollers, means driving the snapping rollers, the driving shaft for the husking rollers, and conveyor means collecting the ears out of the husking means at the rear of the machine.

13. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantial transverse alignment with said input noses, means urging the stalks passing between the two input noses and cut by the cutter into substantial registry with the corresponding end of the pair of snapping rollers, an endless conveyor substantially perpendicular to the direction of progression of the machine and located to the front of the pair of snapping rollers and including a downwardly moving strand facing said rollers and fed by the ears passing out of the snapping rollers and an upwardly moving strand facing away from said rollers and over which the ears are drawn, husking rollers extending in substantial parallelism with said pair of snapping rollers and receiving said ears from said conveyor, means dropping the ears out of the upwardly moving conveyor strand into the cooperating end of the husking rollers, a discharge conveyor for the ears at the outer end of the husking table in substantial alignment with the input gap, a container for collecting the ears passing out of said discharge conveyor, and means driving the snapping rollers, the husking rollers, the endless conveyor and the discharge conveyor.

14. In a corn-harvesting machine adapted to be coupled to a tractor and to move longitudinally along rows of corn stalks, the provision of a wheeled frame, two stalk-raising input noses carried laterally by said frame and adapted to engage and to hold between them the stalks of a row of stalks to one side of the machine, a stalk cutter carried by the frame adjacent said noses, a pair of snapping rollers extending along parallel lines substantially perpendicular to the direction of progression of the machine in substantial transverse alignment with said input noses, the axes of said rollers sloping with reference to a horizontal plane and one of the rollers being located slightly above and to the rear of the other roller, means urging the stalks passing between the two input noses and cut by the cutter into substantial registry with the corresponding end of the pair of snapping rollers, an endless conveyor substantially perpendicular to the direction of progression of the machine and located to the front of the pair of snapping rollers and including a downwardly moving strand facing said rollers and fed by the ears passing out of the snapping rollers and an upwardly moving strand moving away from said rollers and over which the ears are drawn, a husking table including a framing support and at least two pairs of juxtaposed husking rollers extending in a generally transverse direction with reference to the longitudinal axis of progression of the machine and sloping downwardly from the side of the machine opposed to the input noses towards the latter, each husking roller including an inner carrier mandrel provided with two diametrically opposed flat longitudinal surfaces, two yielding strips of substantially trapezoidal shape secured to said flat surfaces and two metal shells fitted over said mandrel, separated by a gap registering with the strips and engaging the cutter ends of said strips to make them project through the gap between the shells, means dropping the ears out of the upwardly moving conveyor strand into the cooperating end of the husking rollers, means driving the snapping rollers, husking rollers and conveyor, and means collecting the ears out of the husking means at the rear of the machine.

References Cited in the file of this patent
UNITED STATES PATENTS

| | | |
|---|---|---|
| 2,371,822 | Hyman | Mar. 20, 1945 |
| 2,826,031 | Hansen | Mar. 11, 1958 |